April 15, 1958    E. V. SUNDT    2,830,458
DRIVING MECHANISM FOR WINDSHIELD WIPERS AND THE LIKE
Filed Dec. 14, 1955    2 Sheets-Sheet 1
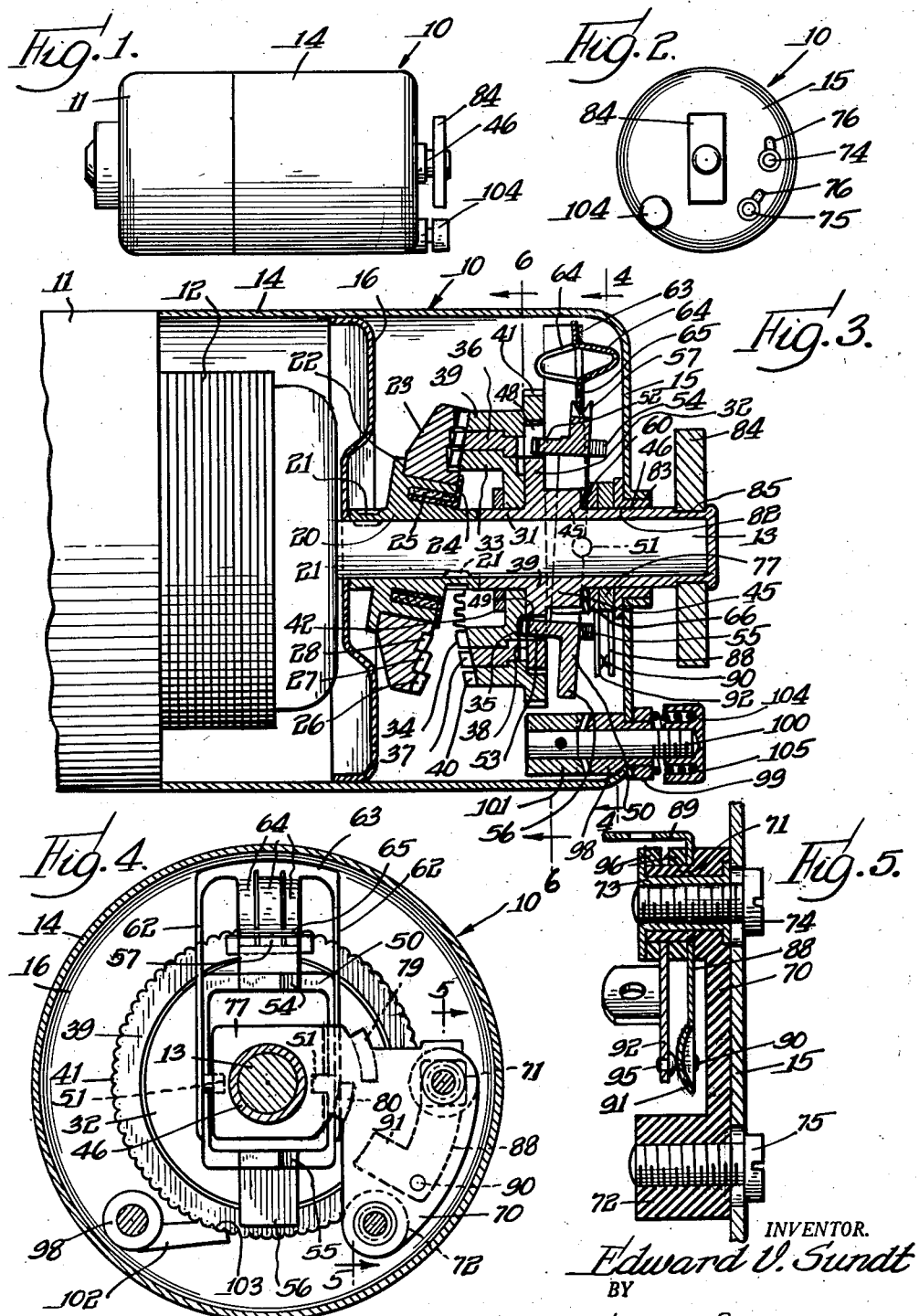
INVENTOR.
Edward V. Sundt April 15, 1958      E. V. SUNDT      2,830,458
DRIVING MECHANISM FOR WINDSHIELD WIPERS AND THE LIKE
Filed Dec. 14, 1955      2 Sheets-Sheet 2
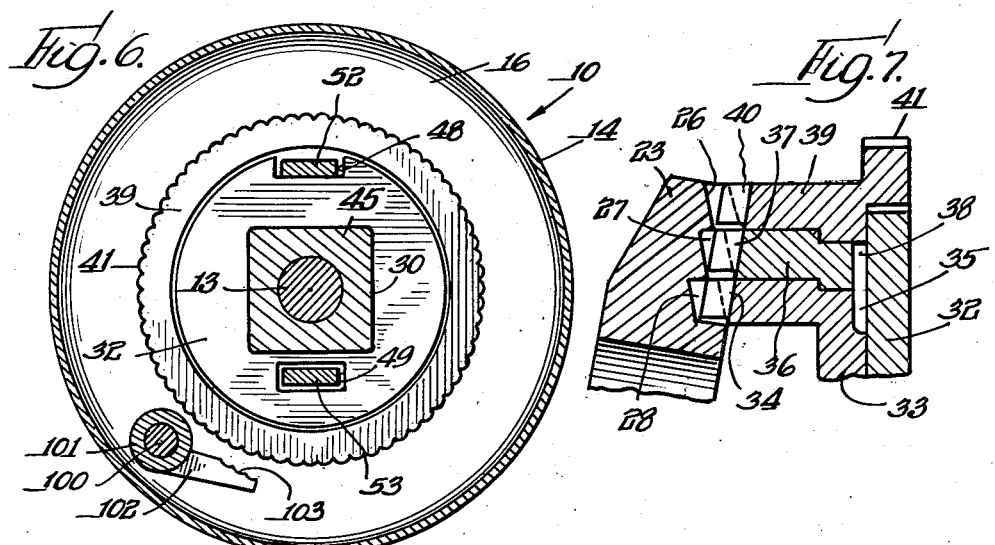
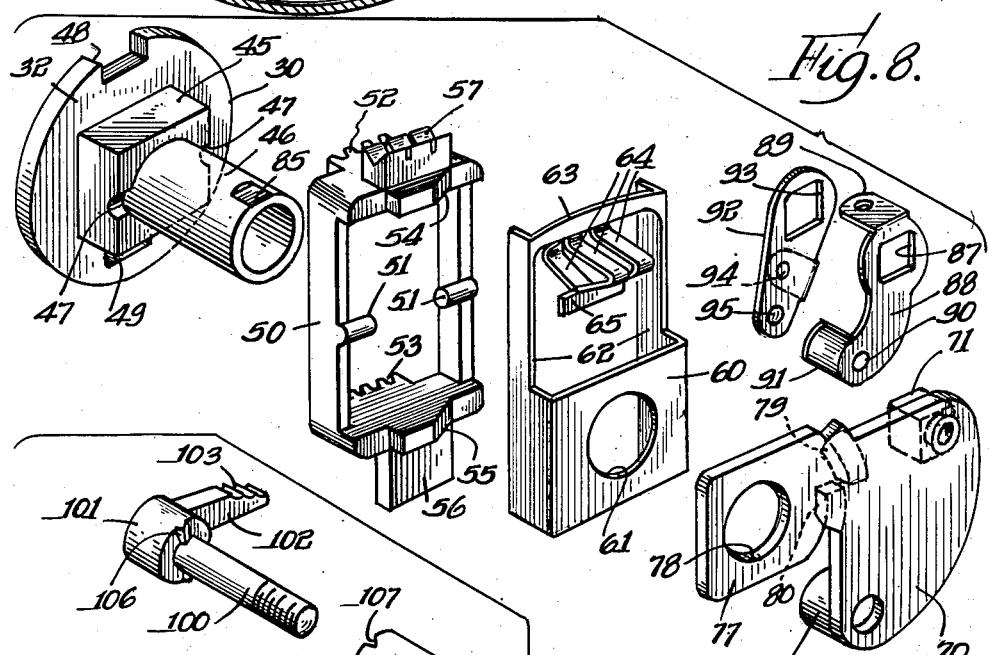
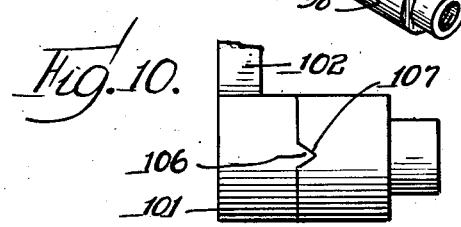
INVENTOR.
Edward V. Sundt
BY
Wallenstein & Spangenberg
attys.

United States Patent Office 2,830,458
Patented Apr. 15, 1958

2,830,458

DRIVING MECHANISM FOR WINDSHIELD WIPERS AND THE LIKE

Edward V. Sundt, Wilmette, Ill.

Application December 14, 1955, Serial No. 553,045

14 Claims. (Cl. 74—70)

The principal object of this invention is to provide a driving mechanism for windshield wipers and the like, wherein the overall unit is compact, small and light in weight, wherein operation for the normal life of the automotive vehicle is provided without need for lubrication, wherein the operating parts are enclosed to be free from dust and dirt, wherein operation is always stopped with the wiper in an end position of its stroke, wherein the drive mechanism is released in the event of an overload condition to prevent burning out of the motor, and which is simple and rugged in construction, foolproof in operation and inexpensive to manufacture.

Briefly, the driving mechanism of this invention for driving windshield wipers and the like includes a rotating shaft driven by an electric motor or the like, an oblique eccentric secured to the shaft for rotation therewith, and a wobbler member rotatably mounted on the oblique eccentric and wobbled thereby and having three rings of gear teeth concentrically arranged on one side thereof. First, second and third gear members are concentrically arranged about the shaft and they mesh, respectively, with the rings of gear teeth on the wobbler member. These toothed gear members are preferably arranged adjacent the wobbler member in nested relation and supported by the rotating shaft to form a compact unit.

Means are provided for securing the first gear member against rotation to cause the same to react against the wobbler member to control the same and to cause the second and third gear members to rotate, the second and third gear members rotating in opposite directions. A rotatably mounted drive member, preferably rotatably mounted on the rotating shaft, is arranged adjacent the gear members, and it is provided with a coupling means which alternately connects the drive member to the second and third gear members for alternately rotating the drive member in opposite directions.

Cam means are associated with the coupling means to connect the drive member to the third gear member when the drive member has been rotated in one direction to a predetermined position by the second gear member and to connect the drive member to the second gear member when the drive member has been rotated in the opposite direction to a predetermined position by the third gear member for oscillating the drive member between said predetermined positions.

Resilient releasable means are also provided for releasing the first gear member to allow the same to rotate when the load on the drive member becomes excessive, which prevents stalling and burning out of the electric motor. Provision is also made for continuing operation of the electric motor, when it is decided to stop the same, until the drive member has moved to a predetermined end position so that the windshield wipers are always stopped in an end or clear view position.

Further objects of this invention reside in the details of construction of the driving mechanism and in the co-operative relationships between the component parts thereof.

Other objects and advantages of this invention will become apparent to those skilled in the art upon reference to the accompanying specification, claims and drawings, in which:

Fig. 1 is a side elevational view of a windshield wiper driving unit having the driving mechanism of this invention incorporated therein.

Fig. 2 is an end elevational view looking from the right of Fig. 1.

Fig. 3 is a vertical sectional view through the driving mechanism of this invention and through a portion of the operating electric motor.

Fig. 4 is a vertical sectional view taken substantially along the line 4—4 of Fig. 3.

Fig. 5 is a sectional view taken substantially along the line 5—5 of Fig. 4.

Fig. 6 is a vertical sectional view taken substantially along the line 6—6 of Fig. 3.

Fig. 7 is an enlarged sectional view of portions of the wobbler member and gear members showing the meshing relationships therebetween.

Fig. 8 is an exploded perspective view illustrating the elements of the driving mechanism alternately driven by the second and third gear members.

Fig. 9 is a perspective view of the elements utilized in securing the first gear member against rotation.

Fig. 10 is a top plan view of the elements illustrated in Fig. 9.

Referring to the drawings and more particularly to Figs. 1 to 4, the automotive windshield wiper unit of this invention is generally designated at 10 and it includes an electric motor having a housing 11 and a motor structure 12 for rotating a shaft 13. The electric motor is of conventional construction and is driven by the electrical system of the automotive vehicle and will operate to rotate the shaft 13 at substantially 3,000 R. P. M. The driving mechanism, which is operated by the electric motor, is arranged concentrically about the extending shaft 13 and it is preferably enclosed by a cover 14 having an end wall 15 which is suitably secured to the motor housing 11 in any desired manner, as by elongated bolts or the like. Preferably, the driving mechanism is separated from the motor 12 by a grease guard 16 suitably secured in place within the cover 14, the shaft 13 extending through the guard 16.

The driving mechanism, which also operates as a speed reducer, includes an oblique eccentric 20 which is preferably moulded of porous iron and which is secured to and carried by the shaft 13 in any suitable manner as by swedging or staking the same thereon, as indicated at 21. As shown for purposes of illustration herein, the axis of the oblique eccentric 20 is arranged at an angle of substantially 10° with respect to the axis of the shaft 13, this angle producing extremely satisfactory results for the particular purposes herein illustrated. The oblique eccentric 20 is provided with a guide flange 22. Rotatably mounted on the oblique eccentric 20 adjacent its flange 22 is a wobbler member 23, which is preferably formed of moulded nylon or the like. The wobbler member 23 is held on the oblique eccentric 20 adjacent the flange 22 by a retaining ring 24 which is pressed-fit into an annular chamber 25 in the eccentric 20. The wobbler member 23 rotates with respect to the oblique eccentric 20 and is also wobbled thereby. Preferably, the oblique eccentric 20 is saturated with a lubricant for lubricating the rotating surfaces between it and the wobbler member 23 and the annular chamber 25 may be provided with a wick member which is saturated with the lubricant for supplying additional lubricant to the oblique eccentric 20. The wobbler member 23 is provided on one face with three concentrically arranged rings of gear teeth 26, 27 and 28, Preferably, these rings of gear teeth are moulded in the wobbler member 23, although they may be cut therein, if so desired. A drive member 30 is rotatably mounted on the rotating shaft 13 and it is provided with sleeve portions 31 and 46 for forming bearing surfaces between the drive member and the shaft. The drive member is also provided with a flange portion 32. Preferably, the drive member 30 is formed of moulded porous iron which is impregnated with a lubricant for lubricating the rotating surfaces between it and the motor shaft 13.

Rotatably mounted on the sleeve portion 31 of the drive member 30 adjacent the flange portion 32 thereof, is a gear member 33 having gear teeth 34 meshing with the ring 28 of gear teeth on the wobbler member 23. This gear member 33 is also provided with teeth 35 adjacent the flange portion 32 of the drive member 30. Rotatably mounted on and nesting with the gear member 33 is another gear member 36 having gear teeth 37 meshing with the ring 27 of gear teeth on the wobbler member 23 and also having teeth 38 adjacent the flange portion 32 of the drive member 30. Rotatably mounted on and nesting with the gear member 36 is another gear member 39 having gear teeth 40 meshing with the ring 26 of gear teeth on the wobbler member 23 and also having radially arranged rounded teeth 41. The gear members 39, 36 and 33, hereinafter referred to as the first, second and third gear members, respectively, are maintained in nested relation for relative rotation on the sleeve portion 31 of the drive member 30 by a retaining ring 42 which is secured on the sleeve portion 31 by a pressed-fit or the like, the gear members continuously meshing with the rings of gear teeth on the wobbler member 23. The gear members 39, 36 and 33 are preferably formed of moulded nylon or the like.

When the first gear member 39 is secured against rotation, it reacts against the wobbler member 23 to control the same and to cause the second and third gear members 36 and 33 to rotate and the relative rotations of the gear members 39, 36 and 33 depend upon the numbers of gear teeth thereon with respect to the numbers of teeth in the rings of gear teeth on the wobbler member 23. As one example, it is assumed that there are 60 teeth in the ring 26 of gear teeth on the wobbler member 23 and 60 teeth 40 on the first gear member 39, that there are 49 teeth in the ring 27 of gear teeth on the wobbler member 23, and 50 teeth 37 on the second gear member 36, and that there are 51 teeth in the ring 28 of gear teeth on the wobbler member 23, and 50 teeth 34 on the third gear member 33, and that the eccentric is rotated at 3,000 R. P. M. Since the number of teeth on the gear member 39 is the same as the number of teeth in the ring 26 of gear teeth on the wobbler member 23, the wobbler member will not rotate about the shaft 13, it merely oscillating. Since the second gear member 36 has one more tooth than the number of teeth in the ring 27 of gear teeth on the wobbler member 23, the gear member 36 is rotated about the shaft 13 in the same direction as the shaft 13 is rotating, the speed of rotation being $$\frac{3,000}{50} = 60 \text{ R. P. M.}$$

in the shaftwise direction. Since the third gear member 33 has one less tooth than the ring 28 of gear teeth on the wobbler member, the gear member 33 is rotated in the opposite or countershaftwise direction at a speed of $$\frac{3,000}{50} = 60 \text{ R. P. M.}$$

in the countershaftwise direction. Accordingly, when the first gear member 39 is secured against rotation, the second and third gear members 36 and 33 are driven at substantially the same speeds in opposite directions, the gear member 36 being driven in a counterclockwise direction, the same as the shaft 13, as illustrated in Figs. 4 and 6, and the third gear member 35 being driven in a clockwise direction opposite to that of the shaft 13.

As another example, it may be assumed that the ring 26 of gear teeth on the wobbler member 23 has 67 teeth and the first gear member 39 has 66 teeth 40, that the ring 27 of gear teeth on the wobbler member 23 has 36 teeth and the second gear member 36 has 36 teeth 37, that the ring 28 of gear teeth on the wobbler member 23 has 36 teeth and the third gear member 33 has 35 teeth 34, and that the shaft 13 is rotated at the speed of 3,000 R. P. M. Since the first gear member 39 has one less tooth than the ring 26 of gear teeth on the wobbler member 23, the wobbler member 23 is rotated in the same direction as the shaft 13 (counterclockwise direction, as illustrated in Figs. 4 and 6) and it is rotated at a speed of $$\frac{3,000}{67} = 45 \text{ R. P. M.}$$

in the shaftwise direction. Since the number of teeth in the second gear member 36 is the same as the number of teeth in the ring 27 of gear teeth on the wobbler member 23, there is no relative rotation between the gear member 36 and the wobbler member 23 so that the gear member 36 is driven in a shaftwise or counterclockwise direction at the same speed as the wobbler member 23, namely, 45 R. P. M. in the shaftwise direction. Since the third gear member 33 has one less tooth than the number of teeth in the ring 28 of gear teeth on the wobbler member 23, the gear member 33 is driven in a countershaftwise or clockwise direction with respect to the wobbler member 23 and at a speed of $$\frac{3,000}{35} = 86 \text{ R. P. M.}$$

in the countershaftwise direction. Since the gear member 33 is rotated by the wobbler member in a countershaftwise direction of 86 R. P. M., and since the wobbler member is rotated in a shaftwise direction at 45 R. P. M., the resultant rotation of the gear member 33 is 86—45=41 R. P. M. in the countershaftwise or clockwise direction. Thus, it is seen that with this selection of gear teeth, the second and third gear members 36 and 33 are driven in opposite directions at substantially the same speed and this is so even though the wobbler member is caused to rotate by the first gear member 39. By the appropriate selection of gear teeth, the second and third gear members may be made to rotate in opposite directions at any desired speeds.

The drive member 30 adjacent the flange portion 32 is provided with a squared portion 45 from which the sleeve portion 46 extends. This squared portion 45 is provided with a pair of semi-cylindrical notches 47 and the flange portion 32 of the drive member 30 is provided with a pair of slots 48 and 49, the slot 48 being arranged radially outwardly farther than the slot 49. The slot 48 is in substantial alignment with the teeth 38 on the second gear member 36 and the slot 49 is in substantial alignment with the teeth 35 on the third gear member 33. A coupling member 50 is provided with a large central opening for receiving the squared portion 45 of the drive member and is also provided with a pair of cylindrical trunnions 51 which are received in the semi-cylindrical notches 47 in the drive member. Thus, the coupling member 50 is pivotally mounted on the squared portion 45 of the drive member 30. One end of the pivoted coupling member includes a projection 52 provided with teeth, which projection is adapted to extend through the slot 48 in the drive member 30 for engaging the teeth 38 of the second gear member 36. Likewise the other end of the pivoted coupling member 50 is provided with a projection 53 provided with teeth, which is adapted to project through the slot 49 in the drive member 30 for engaging the teeth 35 of the third gear member 33. When the pivoted coupling member 50 is pivoted to a first pivoted position, the projection 53 engages the teeth 35 of the third gear member to connect the drive member 30 to the third gear member and when the pivoted coupling member 50 is moved to a second pivoted position, the projection 52 engages the teeth 38 of the second gear member 36 for connecting the drive member 30 to the second gear member 36. In this way, the drive member 30 is alternately connected by the coupling member 50 to the second and third gear members 36 and 33. The coupling member 50 is provided with a pair of cam surfaces 54 and 55 for pivotally moving the same between the first and second pivoted positions. The coupling member is also provided at one end with a projection 56 and at the other end with a transverse V-slot 57. The coupling member 50 is preferably formed of moulded nylon or the like.

The V-slot 57 in the end of the coupling member 50 is utilized for snapping the coupling member 50 between its pivoted positions and toward this end a spring member 60 having a hole 61 is mounted over the bearing portion 46 of the drive member 50, this spring member 60 preferably being formed of heat-treated beryllium copper or the like. The spring member 60 has a pair of arms 62 extending outwardly beyond the coupling member 50 which terminate in a transverse portion 63. Extending inwardly from this transverse portion 63 are formed spring fingers terminating in a knife-edge member 65, which is received in the V-slot 57. The spring member 60 is secured on the sleeve portion 46 of the drive member 30 against the squared portion 45 thereof by a retaining ring 66 which is pressed-fit onto the sleeve portion 46. The knife-edge member 65 operating in the V-slot 57 exerts a force against the coupling member 50 toward the trunnions 51 thereof and as the coupling member 50 is pivoted about the trunnions, it passes over dead center and is resiliently forced to enter the first or second pivoted position by the spring fingers 64 in a snap-acting manner. Thus, the spring fingers 64 operate to provide positive snap-acting movement of the coupling member 50 and to assure firm coupling between the coupling member 50 and the second and third gear members 36 and 33.

Carried by the end wall 15 of the housing 14 and adjacent the spring member 60, is a contact base 70 which is preferably formed of moulded Bakelite or the like. This contact base 70 is provided with a squared boss 71 and a cylindrical boss 72, the squared boss 71 being internally provided with a screw-threaded sleeve 73. A pair of screws 74 and 75 are screwed into the sleeve 73 and into the boss 72 for adjustably securing the contact base to the end wall 15 of the housing, these screws 74 and 75 extending through slots 76 in the end wall 15. Thus, the contact base 70 is mounted for circumferential adjustment about the sleeve portion 46 of the drive member 30. The contact base 70 is also provided with a portion 77 having a hole 78 therein for receiving the sleeve portion 46 of the drive member 30. The contact base 70 is also provided with a pair of cam surfaces 79 and 80 which co-operate, respectively, with the cam surfaces 54 and 55 on the coupling member 50. When the coupling member 50 is in the first pivoted position to couple the drive member 30 to the gear member 33, the coupling member and drive member are rotated in a countershaftwise or clockwise direction and when the coupling member and drive member are so rotated to a pre-determined position wherein the cam surface 54 engages the cam surface 79, the coupling member 50 is pivoted with a snap action to the second position. When this occurs, the coupling member 50 is released from the third gear member 33 and is coupled to the second gear member 36 and it and the drive member 30 are then rotated in a shaftwise or counterclockwise direction by the gear member 36 and this rotation continues until the cam surface 55 engages the cam surface 80 to snap the coupling member 50 from the second pivoted position to the first pivoted position whereupon the cycle of oscillation of the drive member 30 is repeated. The cam surfaces 79 and 80 are so located with respect to the cam surfaces 54 and 55, that the coupling member 50 and drive member 30 are oscillated through substantially 120 angular degrees.

The sleeve portion 46 of the drive member 30 is preferably journalled for rotation in a bearing bushing 82 which is preferably formed of powdered bronze which is impregnated with a suitable lubricant. The bearing bushing 82 is secured in place in the end wall 15 of the cover by a ring 83 which is pressed-fit onto the bearing bushing. This bearing bushing 82, in addition to acting directly as a bearing for the sleeve portion 46 of the drive member, also acts indirectly as an outboard bearing for the motor shaft 13, since the motor shaft 13 is rotatably mounted within the sleeve portion 46 of the drive member. A bracket or arm 84 is secured to flats 85 on the outer end of the sleeve portion 46 of the drive member 30 and is utilized for the purpose of oscillating the windshield wipers as the driving member 30 is so oscillated.

A contact arm 88, preferably formed of heat-treated beryllium copper is provided with a square opening 87 for mounting the same on the squared boss 71 of the contact base 70. This contact arm 88 is provided with a terminal tab 89 for making electrical connection thereto and also with a contact 90. The free end of the contact arm 88 is provided with a curved projection 91 which is adapted to be engaged by the projection 56 on the coupling member 50 at about the time the cam surface 55 moves into engagement with the cam surface 80, for the purpose of moving the contact 90 toward the end wall 15 of the cover. A contact arm 92, preferably formed of brass or the like, is provided with a squared hole 93 for mounting the same on the squared boss 71 of the contact base 70. This contact arm 92 is also provided with a terminal tab 94 for establishing electrical connection thereto and with a contact 95 adapted to be engaged by the contact 90. The contact arms 88 and 92 are spaced from each other and from a flange on the screw-threaded sleeve 73 by means of electrical insulating washers 96, the entire contact assembly being held in place on the squared boss 71 by the flange on the screw-threaded sleeve 73. Normally, the contacts 90 and 95 engage each other, but are separated when the projection 56 on the coupling member 50 engages the curved projection 91 on the spring arm 88. The electric motor 12 is connected to the source of voltage of the automotive vehicle through a switch for starting and stopping the same and the contacts 90 and 95 form a switch means which is arranged in parallel with the aforementioned control switch. Thus, when the control switch is closed, the electric motor 12 is operated to cause oscillation of the drive member 30. When, however, the control switch is opened to stop operation of the electric motor 12, the electric motor is continued in operation by the parallel switch means including the contacts 90 and 95 until such time as the contacts 90 and 95 are separated by the projection 56 on the coupling member 50. Accordingly, the electric motor is kept in operation until the drive member 30 is oscillated to an extreme end position before it is stopped. In this way, the windshield wipers are always stopped in an end or clear-view position.

The means for securing the first gear member 39 against the wobbler member 23, includes resilient releasable means which are shown more clearly in the lower portions of Figs. 3, 4 and 6 and in Figs. 9 and 10. Here, a sleeve 98 is secured through an opening in the end wall 15 by a ring 99 which is pressed-fit thereon. The sleeve 98 receives a shaft 100 and secured to the inner end of the shaft 100 is a hub 101 having an arm 102 provided with teeth 103 engaging the rounded teeth 41 on the first gear member 39. A knob 104 is screwed onto the outer end of the shaft 100 and is locked in place thereon and interposed between the knob 104 and the ring 99 is a compression spring 105. The compression spring 105 operates to urge the hub 101 against the sleeve 99. The hub 101 is provided with a projection 106 which is adapted to be received in a V-slot 107 in the end of the sleeve 98 and it is resiliently maintained therein by the action of the spring 105. When the projection 106 is in the V-slot 107, the teeth 103 on the arm 102 engage the rounded teeth 41 on the first gear member 39 for securing the same against rotation. If, now, the load on the drive member 30 should become excessive, this excessive load reacts against the first gear member 39 and operates to cause the rounded gear teeth 41 thereof to slip with respect to the teeth 103 on the arm 102, this slipping being permitted by the projection 106 riding out of the V-slot 107 against the action of the spring 105. Accordingly, when the load on the drive member becomes excessive, the first gear member 39 is allowed to rotate so that stalling and burning out of the electric motor under these excessive load conditions are prevented.

To bring about quiet operation with least amount of gear friction, it is desirable to so construct the gear teeth of the gear members 39, 36 and 33 and the rings 26, 27 and 38 of gear teeth on the wobbler member 23, that as they are coming into engagement with each other there is substantially a point contact as distinguished from a line contact. Toward this end the top edges of the gears are arranged at an angle with respect to the radial axes of the gear members and the wobbler member. For the optimum results in the particular embodiment herein described and, as shown in more detail in Fig. 7, this angle is made equal to the angle of the oblique eccentric 20, namely, 10°. It is found that quite satisfactory results are obtained if the top edges of the teeth on the gear members and the mating top edges of the teeth of the rings of teeth on the wobbler member have a total angle therebetween at least as great as the angle between the axis of the oblique eccentric and the axis of the shaft.

While for purposes of illustration one form of this invention has been disclosed, other forms thereof may become apparent to those skilled in the art upon reference to this disclosure and, therefore, this invention is to be limited only by the scope of the appended claims.

I claim as my invention:

1. A driving mechanism for windshield wipers and the like comprising, a rotating shaft, an oblique eccentric secured to the shaft for rotation therewith, a wobbler member rotatably mounted on the oblique eccentric and wobbled thereby and having three rings of gear teeth concentrically arranged thereon, first, second and third toothed gear members meshing respectively with the rings of gear teeth on the wobbler member, means for securing the first gear member against rotation to cause the same to react against the wobbler member to control the same and to cause the second and third gear members to rotate, said rings of gear teeth and said gear members having selected numbers of teeth to cause said second and third gear members to rotate in opposite directions, a rotatably mounted drive member, and coupling means carried by the drive member alternately connecting the drive member to the second and third gear members for alternately rotating the drive member in opposite directions.

2. A driving mechanism for windshield wipers and the like comprising, a rotating shaft, an oblique eccentric secured to the shaft for rotation therewith, a wobbler member rotatably mounted on the oblique eccentric and wobbled thereby and having three rings of gear teeth concentrically arranged on one side face thereof, first, second and third toothed gear members concentrically arranged in nested relation about the shaft adjacent said side face of the wobbler member and supported by the shaft and meshing respectively with the rings of gear teeth on the wobbler member, means for securing the first gear member against rotation to cause the same to react against the wobbler member to control the same and to cause the second and third gear members to rotate, said rings of gear teeth and said gear members having selected numbers of teeth to cause said second and third gear members to rotate in opposite directions, a drive member rotatably mounted on the shaft adjacent said gear members, and coupling means carried by the drive member alternately connecting the drive member to the second and third gear members for alternately rotating the drive member in opposite directions.

3. A driving mechanism for windshield wipers and the like comprising, a rotating shaft, an oblique eccentric secured to the shaft for rotation therewith, a wobbler member rotatably mounted on the oblique eccentric and wobbled thereby and having three rings of gear teeth concentrically arranged thereon, first, second and third toothed gear members meshing respectively with the rings of gear teeth on the wobbler member, means for securing the first gear member against rotation to cause the same to react against the wobbler member to control the same and to cause the second and third gear members to rotate, said rings of gear teeth and said gear members having selected numbers of teeth to cause said second and third gear members to rotate in opposite directions, a rotatably mounted drive member, coupling means carried by the drive member alternately connecting the drive member to the second and third gear members, and means for shifting said coupling means to cause the same to connect the drive member to the third gear member when the drive member has been rotated in one direction to a predetermined position by the second gear member and to connect the drive member to the second gear member when the drive member has been rotated in the opposite direction to a predetermined position by the third gear member for oscillating the drive member between said predetermined positions.

4. A driving mechanism for windshield wipers and the like comprising, a rotating shaft, an oblique eccentric secured to the shaft for rotation therewith, a wobbler member rotatably mounted on the oblique eccentric and wobbler thereby and having three rings of gear teeth concentrically arranged thereon, first, second and third toothed gear members meshing, respectively, with the rings of gear teeth on the wobbler member, means for securing the first gear member against rotation to cause the same to react against the wobbler member to control the same and to cause the second and third gear members to rotate, said rings of gear teeth and said gear members having selected numbers of teeth to cause said second and third gear members to rotate in opposite directions, a rotatably mounted drive member, a coupling member pivotally mounted on the drive member and having means connecting the drive member to the third gear member when in a first pivoted position and means connecting the drive member to the second gear member when in a second pivoted position, spring means for snapping the coupling member between its pivoted positions, and cam means for moving said coupling member to the first pivoted position to cause the same to connect the coupling member to the third gear member when the drive member has been rotated in one direction to a predetermined position by the second gear member and to move said coupling member to the second pivoted position to cause the same to connect the coupling member to the second gear member when the drive member has been rotated in the opposite direction to a predetermined position by the third gear member for oscillating the drive member between said predetermined positions.

5. A driving mechanism for windshield wipers and the like comprising, a rotating shaft, an oblique eccentric secured to the shaft for rotation therewith, a wobbler member rotatably mounted on the oblique eccentric and wobbled thereby and having three rings of gear teeth concentrically arranged on one side face thereof, first, second and third toothed gear members concentrically arranged in nested relation about the shaft adjacent said side face of the wobbler member and supported by the shaft and meshing, respectively, with the rings of gear teeth on the wobbler member, means for securing the first gear member against rotation to cause the same to react against the wobbler member to control the same and to cause the second and third gear members to rotate, said rings of gear teeth and said gear members having selected numbers of teeth to cause said second and third gear members to rotate in opposite directions, a drive member rotatably mounted on the shaft adjacent said gear members, coupling means carried by the drive member alternately connecting the drive member to the second and third gear members, and means for shifting said coupling means to cause the same to connect the drive member to the third gear member when the drive member has been rotated in one direction to a predetermined position by the second gear member and to connect the drive member to the second gear member when the drive member has been rotated in the opposite direction to a predetermined position by the third gear member for oscillating the drive member between said predetermined positions.

6. A driving mechanism for windshield wipers and the like comprising, a rotating shaft, an oblique eccentric secured to the shaft for rotation therewith, a wobbler member rotatably mounted on the oblique eccentric and wobbled thereby and having three rings of gear teeth concentrically arranged on one side face thereof, first, second and third toothed gear members concentrically arranged in nested relation about the shaft adjacent said side face of the wobbler member and supported by the shaft and meshing, respectively, with the rings of gear teeth on the wobbler member, means for securing the first gear member against rotation to cause the same to react against the wobbler member to control the same and to cause the second and third gear members to rotate, said rings of gear teeth and said gear members having selected numbers of teeth to cause said second and third gear members to rotate in opposite directions, a drive member rotatably mounted on the shaft adjacent said gear members, a coupling member pivotally mounted on the drive member and having means connecting the drive member to the third gear member when in a first pivoted position and means connecting the drive member to the second gear member when in a second pivoted position, spring means for snapping the coupling member between its pivoted positions, and cam means for moving said coupling member to the first pivoted position to cause the same to connect the coupling member to the third gear member when the drive member has been rotated in one direction to a predetermined position by the second gear member and to move said coupling member to the second pivoted position to cause the same to connect the coupling member to the second gear member when the drive member has been rotated in the opposite direction to a predetermined position by the third gear member for oscillating the drive member between said predetermined positions.

7. A driving mechanism for windshield wipers and the like comprising, a rotating shaft, an oblique eccentric secured to the shaft for rotation therewith, a wobbler member rotatably mounted on the oblique eccentric and wobbled thereby and having three rings of gear teeth concentrically arranged thereon, first, second and third toothed gear members meshing, respectively, with the rings of gear teeth on the wobbler member, means for securing the first gear member against rotation to cause the same to react against the wobbler member to control the same and to cause the second and third gear members to rotate, said rings of gear teeth and said gear members having selected numbers of teeth to cause said second and third gear members to rotate in opposite directions, a rotatably mounted drive member, and coupling means carried by the drive member alternately connecting the drive member to the second and third gear members for alternately rotating the drive member in opposite directions, said means for securing said first gear member against rotation including resilient releasable means for releasing said first gear member to allow the same to rotate when the load on the drive member becomes excessive.

8. A driving mechanism for windshield wipers and the like comprising, a rotating shaft, an oblique eccentric secured to the shaft for rotation therewith, a wobbler member rotatably mounted on the oblique eccentric and wobbled thereby and having three rings of gear teeth concentrically arranged on one side face thereof, first, second and third toothed gear members concentrically arranged in nested relation about the shaft adjacent said side face of the wobbler member and supported by the shaft and meshing respectively with the rings of gear teeth on the wobbler member, means for securing the first gear member against rotation to cause the same to react against the wobbler member to control the same and to cause the second and third gear members to rotate, said rings of gear teeth and said gear members having selected numbers of teeth to cause said second and third gear members to rotate in opposite directions, a drive member rotatably mounted on the shaft adjacent said gear members, and coupling means carried by the drive member alternately connecting the drive member to the second and third gear members for alternately rotating the drive member in opposite directions, said means for securing said first gear member against rotation including resilient releasable means for releasing said first gear member to allow the same to rotate when the load on the drive member becomes excessive.

9. A driving mechanism for windshield wipers and the like comprising, an electric motor, a shaft driven by the motor, an oblique eccentric secured to the shaft for rotation therewith, a wobbler member rotatably mounted on the oblique eccentric and wobbled thereby and having three rings of gear teeth concentrically arranged thereon, first, second and third toothed gear members meshing, respectively, with the rings of gear teeth on the wobbler member, means for securing the first gear member against rotation to cause the same to react against the wobbler member to control the same and to cause the second and third gear members to rotate, said rings of gear teeth and said gear members having selected numbers of teeth to cause said second and third gear members to rotate in opposite directions, a rotatably mounted drive member, coupling means carried by the drive member alternately connecting the drive member to the second and third gear members, means for shifting said coupling means to cause the same to connect the drive member to the third gear member when the drive member has been rotated in one direction to a predetermined position by the second gear member and to connect the drive member to the second gear member when the drive member has been rotated in the opposite direction to a predetermined position by the third gear member for oscillating the drive member between said predetermined positions, electrical means for starting and stopping the electric motor and including normally closed switch means for maintaining the electric motor in operation, and means on the coupling means engaging the switch means for opening the same when the drive member reaches one of said predetermined positions for continuing motor operation until the drive means is oscillated to said predetermined position and then stopping the motor.

10. A driving mechanism for windshield wipers and the like comprising, a rotating shaft, an eccentric secured to the shaft for rotation therewith, a member rotatably mounted on the eccentric and oscillated thereby and having three rings of gear teeth thereon, first, second and third toothed gear members meshing respectively with the rings of gear teeth on the member, means for securing the first gear member against rotation to cause the same to react against the oscillating member to control the same and to cause the second and third gear members to rotate, said rings of gear teeth and said gear members having selected numbers of teeth to cause said second and third gear members to rotate in opposite directions, a rotatably mounted drive member, and coupling means carried by the drive member alternately connecting the drive member to the second and third gear members for alternately rotating the drive member in opposite directions.

11. A driving mechanism for windshield wipers and the like comprising, a rotating shaft, an eccentric secured to the shaft for rotation therewith, a member rotatably mounted on the eccentric and oscillated thereby and having three rings of gear teeth thereon, first, second and third toothed gear members meshing respectively with the rings of gear teeth on the member, means for securing the first gear member against rotation to cause the same to react against the oscillating member to control the same and to cause the second and third gear members to rotate, said rings of gear teeth and said gear members having selected numbers of teeth to cause said second and third gear members to rotate in opposite directions, a rotatably mounted drive member, coupling means carried by the drive member alternately connecting the drive member to the second and third gear members, and means for shifting said coupling means to cause the same to connect the drive member to the third gear member when the drive member has been rotated in one direction to a predetermined position by the second gear member and to connect the drive member to the second gear member when the drive member has been rotated in the opposite direction to a predetermined position by the third gear member for oscillating the drive member between said predetermined positions.

12. A driving mechanism for windshield wipers and the like comprising, a rotating shaft, an eccentric secured to the shaft for rotation therewith, a member rotatably mounted on the eccentric and oscillated thereby and having three rings of gear teeth thereon, first, second and third toothed gear members meshing respectively with the rings of gear teeth on the member, means for securing the first gear member against rotation to cause the same to react against the oscillating member to control the same and to cause the second and third gear members to rotate, said rings of gear teeth and said gear members having selected numbers of teeth to cause said second and third gear members to rotate in opposite directions, a rotatably mounted drive member, a coupling member pivotally mounted on the drive member and having means connecting the drive member to the third gear member when in a first pivoted position and means connecting the drive member to the second gear member when in a second pivoted position, spring means for snapping the coupling member between its pivoted positions, and cam means for moving said coupling member to the first pivoted position to cause the same to connect the coupling member to the third gear member when the drive member has been rotated in one direction to a predetermined position by the second gear member and to move said coupling member to the second pivoted position to cause the same to connect the coupling member to the second gear member when the drive member has been rotated in the opposite direction to a predetermined position by the third gear member for oscillating the drive member between said predetermined positions.

13. A driving mechanism for windshield wipers and the like comprising, a rotating shaft, an eccentric secured to the shaft for rotation therewith, a member rotatably mounted on the eccentric and oscillated thereby and having three rings of gear teeth thereon, first, second and third toothed gear members meshing respectively with the rings of gear teeth on the member, means for securing the first gear member against rotation to cause the same to react against the oscillating member to control the same and to cause the second and third gear members to rotate, said rings of gear teeth and said gear members having selected numbers of teeth to cause said second and third gear members to rotate in opposite directions, a rotatably mounted drive member, and coupling means carried by the drive member alternately connecting the drive member to the second and third gear members or alternately rotating the drive member in opposite directions, said means for securing said first gear member against rotation including resilient releasable means for releasing said first gear member to allow the same to rotate when the load on the drive member becomes excessive.

14. A driving mechanism for windshield wipers and the like comprising, an electric motor, a shaft driven by the motor, an eccentric secured to the shaft for rotation therewith, a member rotatably mounted on the eccentric and oscillated thereby and having thre rings of gear teeth thereon, first, second and third toothed gear members meshing respectively with the rings of gear teeth on the member, means for securing the first gear member against rotation to cause the same to react against the oscillating member to control the same and to cause the second and third gear members to rotate, said rings of gear teeth and said gear members having selected numbers of teeth to cause said second and third gear members to rotate in opposite directions, a rotatably mounted drive member, coupling means carried by the drive member alternately connecting the drive member to the second and third gear members, and means for shifting said coupling means to cause the same to connect the drive member to the third gear member when the drive member has been rotated in one direction to a predetermined position by the second gear member and to connect the drive member to the second gear member when the drive member has been rotated in the opposite direction to a predetermined position by the third gear member for oscillating the drive member between said predetermined positions, electrical means for starting and stopping the electric motor and including normally closed switch means for maintaining the electric motor in operation, and means on the coupling means engaging the switch means for opening the same when the drive member reaches one of said predetermined positions for continuing motor operation until the drive means is oscillated to said predetermined position and then stopping the motor

References Cited in the file of this patent

UNITED STATES PATENTS 1,144,808  Bronner et al. _____ June 29, 1915